United States Patent
Sivasankaran et al.

(10) Patent No.: US 12,481,455 B2
(45) Date of Patent: Nov. 25, 2025

(54) DATA RECOVERY FOR ZONED NAMESPACE DEVICES

(71) Applicant: Sandisk Technologies, Inc., Milpitas, CA (US)

(72) Inventors: Vijay Sivasankaran, Dublin, CA (US); Oleg Kragel, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 306 days.

(21) Appl. No.: 17/903,528

(22) Filed: Sep. 6, 2022

(65) Prior Publication Data

US 2024/0078039 A1    Mar. 7, 2024

(51) Int. Cl.
*G06F 3/06* (2006.01)

(52) U.S. Cl.
CPC .......... *G06F 3/0659* (2013.01); *G06F 3/0604* (2013.01); *G06F 3/0644* (2013.01); *G06F 3/0656* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 11,194,489 B2 | 12/2021 | Alrod et al. | |
| 11,307,931 B1 | 4/2022 | Bert | |
| 2020/0409589 A1 | 12/2020 | Bennett et al. | |
| 2021/0132827 A1 | 5/2021 | Helmick et al. | |
| 2021/0240584 A1 | 8/2021 | Pu | |
| 2021/0271579 A1 | 9/2021 | Frolikov | |
| 2021/0326048 A1 | 10/2021 | Karr | |
| 2021/0382643 A1 | 12/2021 | Muthiah | |
| 2022/0075545 A1 | 3/2022 | Agarwal | |
| 2022/0100419 A1* | 3/2022 | Jang | G06F 3/0656 |
| 2022/0179742 A1 | 6/2022 | Yadav et al. | |
| 2022/0197554 A1* | 6/2022 | Liu | G06F 11/1004 |
| 2022/0229722 A1* | 7/2022 | Karkra | G06F 3/0634 |
| 2023/0161500 A1* | 5/2023 | Doucette | G06F 3/0688 |
| | | | 711/5 |

OTHER PUBLICATIONS

International Search Report and Written Opinion for Application No. PCT/US2023/068569 dated Sep. 21, 2023 (9 pages).

* cited by examiner

*Primary Examiner* — Baboucarr Faal
(74) *Attorney, Agent, or Firm* — Michael Best & Friedrich LLP

(57) ABSTRACT

Zone Write Groups (ZWGs) to assist data storage devices and host devices with data recovery. In one embodiment, a data storage device includes a memory storing a Zoned NameSpace (ZNS). The ZNS includes a ZWG including host zones and parity zones. An interface connects the data storage device with a host device. The data storage device includes a data storage device controller including an electronic processor and a memory. The data storage device controller populates the ZWG with buffers received from the host device. The data storage device controller detects corrupted data associated with the ZNS and requests one or more buffers stored in the ZWG. Once the data storage device controller receives the one or more buffers from the ZWG, the data storage device controller performs a recovery event with the one or more buffers.

14 Claims, 6 Drawing Sheets

DATA RECOVERY FOR ZONED NAMESPACE DEVICES

FIELD

This application relates generally to data storage devices, and more particularly, to data storage devices implementing zoned namespace architecture and methods to recover damaged data using buffered data.

SUMMARY

To increase performance, data storage devices may implement Zoned NameSpace (ZNS) architecture, in which no garbage collection (GC) process will be executed within a solid-state drive (SSD) of the data storage device if the write input/outputs (I/Os) are always sequential from a host application. In other words, ZNS SSDs expect the host application(s) to always perform sequential writes, providing constant predictable performance.

In some implementations, ZNS zone capacity matches the size of an erase unit that makes implementation of full zone failure protection function on the SSD controller problematic. Additionally, this function may cause significant loss of space for overprovisioning. Alternatively, ZNS zone capacity may be increased to match the size of multiple erase units. However, larger ZNS zone capacities limit the system parallelism from the host perspective and come with their own overheads and limitations.

To assist with data recovery, embodiments described herein provide for Zone Write Groups (ZWGs) that combine host zones of similar data lifespan expectancy ratings (e.g., an amount of time to overwrite) together. The host zones are paired with one or more parity zones to assist with parity accumulation and other storage algorithms. In some instances, the ZWGs also assist with GC processes. However, in other instances, the GC processes performed by the data storage device are not necessary, as a connected host device may instead timely invalidate the host zones.

The disclosure provides a data storage controller including, in one embodiment, a memory and a data storage device controller. The memory includes a plurality of zones in a ZNS, the ZNS including a ZWG including a plurality of host zones and a plurality of parity zones. The data storage device controller includes an electronic processor and a data storage controller memory storing a set of instructions that, when executed by the electronic processor, instruct the controller to detect corrupted data associated with the ZNS and request one or more buffers stored in the ZWG. The controller receives the one or more buffers from the ZWG and performs a recovery process using the one or more buffers.

The disclosure also provides a method. The method includes constructing, with a data storage device controller, a ZWG including one or more host zones and one or more parity zones. The method includes writing, with the data storage device controller, a host data buffer to a host zone of the one or more host zones and a parity buffer to a parity zone of the one or more parity zones. The method includes detecting, with the data storage device controller, corrupted data associated with a ZNS and requesting, with the data storage device controller, one or more buffers stored in the ZWG. The method includes receiving, with the data storage device controller, the one or more buffers from the ZWG, and performing, with the data storage device controller, a recovery event with the one or more buffers.

The disclosure also provides a data storage device including a memory, an interface configured to connect with a host device, and a data storage device controller. The memory includes a plurality of zones in a ZNS, the ZNS including a ZWG including a plurality of host zones and a plurality of parity zones. The data storage device controller includes an electronic processor and a data storage controller memory storing a set of instructions that, when executed by the electronic processor, instruct the controller to receive a plurality of buffers from the host device, populate a host zone of the plurality of host zones with a buffer of the plurality of buffers, detect corrupted data associated with the ZNS, request the buffer stored in the host zone, receive the buffer from the host zone, and perform a recovery event with the buffer that is received from the host zone.

Various aspects of the present disclosure provide for improvements data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the data storage controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, MRAM, etc.

Figure 1:
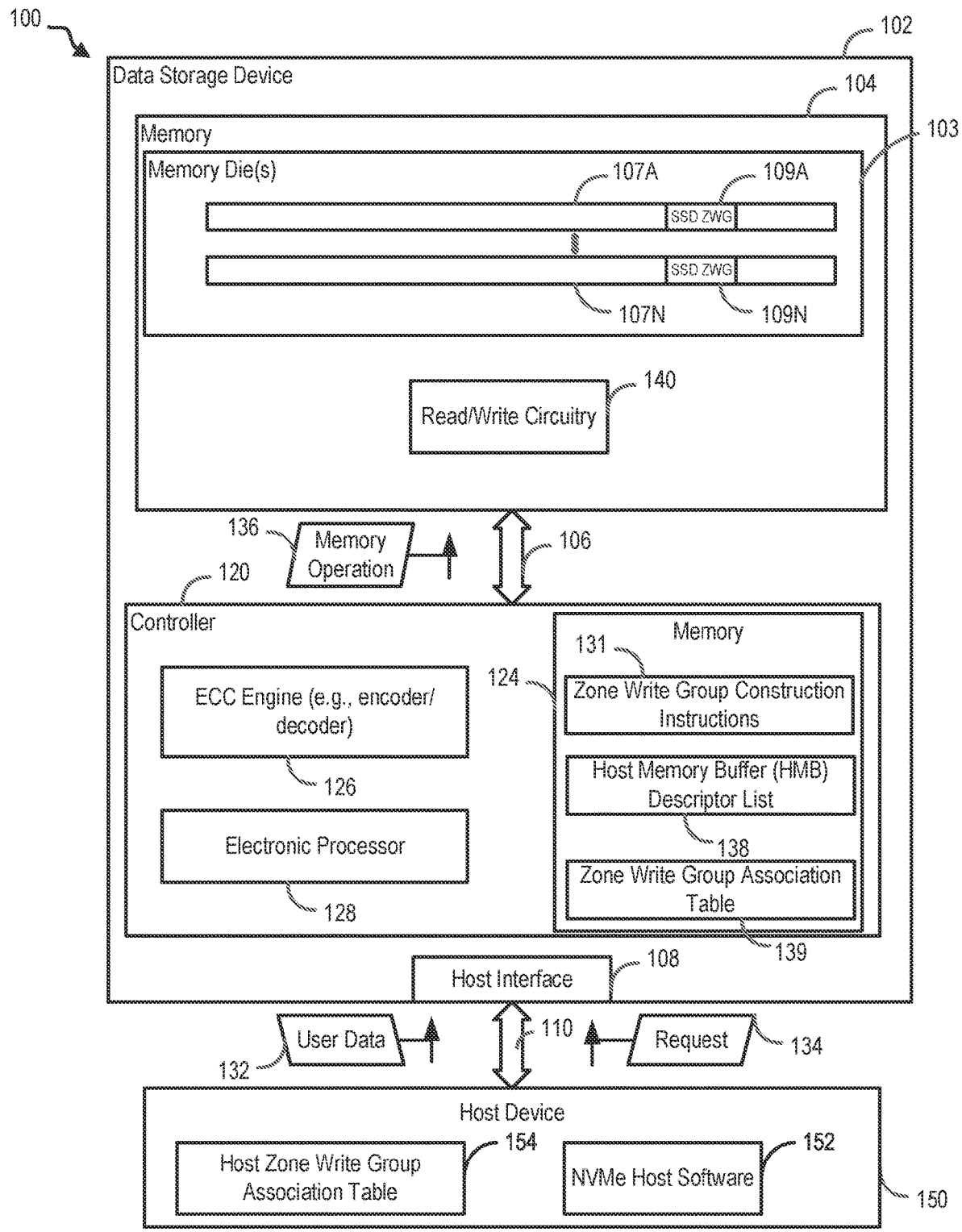
FIG. 1 is block diagram of a system including a data storage device and a host device, in accordance with some embodiments of the disclosure.

FIG. 1 is block diagram of a system including a data storage device and a host device, in accordance with some embodiments of the disclosure. In the example of FIG. 1, the system 100 includes a data storage device 102 and a host device 150. The data storage device 102 includes a controller 120 (referred to hereinafter as "data storage device controller") and a memory 104 (e.g., non-volatile memory) that is coupled to the data storage device controller 120.

One example of the structural and functional features provided by the data storage device controller 120 are illustrated in FIG. 1 in a simplified form. The data storage device controller 120 may also include additional modules or components other than those specifically illustrated in FIG. 1. Additionally, although the data storage device 102 is illustrated in FIG. 1 as including the data storage device controller 120, in other implementations, the data storage device controller 120 is instead located separate from the data storage device 102. As a result, operations that would normally be performed by the data storage device controller 120 described herein may be performed by another device that connects to the data storage device 102.

The data storage device 102 and the host device 150 may be operationally coupled via a connection (e.g., a communication path 110), such as a bus or a wireless connection. In some examples, the data storage device 102 may be embedded within the host device 150. Alternatively, in other examples, the data storage device 102 may be removable from the host device 150 (i.e., "removably" coupled to the host device 150). As an example, the data storage device 102 may be removably coupled to the host device 150 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 150 via the communication path 110, such as a wired communication path and/or a wireless communication path. For example, the data storage device 102 may include an interface 108 (e.g., a host interface) that enables communication via the communication path 110 between the data storage device 102 and the host device 150, such as when the interface 108 is communicatively coupled to the host device 150.

The host device 150 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. The host device 150 may issue one or more commands to the data storage device 102, such as one or more requests to erase data at, read data from, or write data to the memory 104 of the data storage device 102. For example, to write data to the memory 104, the host device 150 transmits ZNS host write commands to the data storage device 102, which includes both data written to the ZNS and buffers stored in a ZWG in the memory 104. Additionally, the host device 150 may issue one or more vendor specific commands to the data storage device 102 to notify and/or configure the data storage device 102. For example, the host device 150 may be configured to provide data, such as user data 132, to be stored at the memory 104, or to request data, by request 134, to be read from the memory 104. The host device 150 may include a mobile smartphone, a music player, a video player, a gaming console, an electronic book reader, a personal digital assistant (PDA), a computer, such as a laptop computer or notebook computer, any combination thereof, or other suitable electronic device.

The host device 150 communicates via a memory interface that enables reading from the memory 104 and writing to the memory 104. The host device 150 operates in compliance with one or more industry specifications including the Non-Volatile Memory (NVMe) Host Controller specification. In particular, the host device 150 includes a NVMe Host Software 152 that the electronic processor of the host device 150 executes to operate in compliance with the NVMe Host Controller specification. The NVMe Host Software 152 is part of the software on the host device 150, and the software on the host device 150 includes application software, system software, programming software, driver software, and/or any other suitable software. In some examples, the NVMe Host Software 152 may be one or more drivers that are part of the driver software on the host device 150. Additionally, in some instances, the host device 150 includes a host ZWG association table 154 that mirrors a ZWG association table 139 stored in the memory 124, described below in more detail. In some instances, a copy of the ZWG association table 139 is stored in the memory 104 in addition to the ZWG association table 139 stored in the memory 124.

In other examples, the host device 150 may operate in compliance with other specifications, such as a Universal Flash Storage (UFS) Host Controller Interface specification, a Universal Serial Bus specification, or other suitable industry specification. The host device 150 may also communicate with the memory 104 in accordance with any other suitable communication protocol.

The memory 104 of the data storage device 102 may include a non-volatile memory (e.g., NAND, 3D NAND family of memories, or other suitable memory). In some examples, the memory 104 may be any type of flash memory. For example, the memory 104 may be two-dimensional (2D) memory or three-dimensional (3D) flash memory. The memory 104 may include one or more memory dies 103. Each of the one or more memory dies 103 may include one or more blocks (e.g., one or more erase blocks). Each block may include one or more groups of storage elements, such as a representative group of storage elements 107A-107N. The group of storage elements 107A-107N may be configured as a word line. The group of storage elements 107 may include multiple storage elements, such as a representative storage elements 109A and 109N, respectively. The group of storage elements 107A-107N may include zoned namespaces for storing data. The representative storage elements 109A and 109N may be SSD ZWGs, as described below in more detail.

The memory 104 may include support circuitry, such as read/write circuitry 140, to support operation of the one or more memory dies 103. Although depicted as a single component, the read/write circuitry 140 may be divided into separate components of the memory 104, such as read circuitry and write circuitry. The read/write circuitry 140 may be external to the one or more memory dies 103 of the memory 104. Alternatively, one or more individual memory dies may include corresponding read/write circuitry that is operable to read from and/or write to storage elements within the individual memory die independent of any other read and/or write operations at any of the other memory dies.

The data storage device 102 includes the data storage device controller 120 coupled to the memory 104 (e.g., the one or more memory dies 103) via a bus 106, an interface (e.g., interface circuitry), another structure, or a combination thereof. For example, the bus 106 may include multiple distinct channels to enable the data storage device controller 120 to communicate with each of the one or more memory dies 103 in parallel with, and independently of, communication with the other memory dies 103. In some implementations, the memory 104 may be a flash memory.

The data storage device controller 120 is configured to receive data and instructions from the host device 150 and to send data to the host device 150. For example, the data storage device controller 120 may send data to the host device 150 via the interface 108, and the data storage device controller 120 may receive data from the host device 150 via the interface 108. The data storage device controller 120 is configured to send data and commands (e.g., the memory operation 136) to the memory 104 and to receive data from the memory 104. For example, the data storage device controller 120 is configured to send data and a write command to cause the memory 104 to store data to a specified address of the memory 104. The write command may specify a physical address of a portion of the memory 104 (e.g., a physical address of a word line of the memory 104) that is to store the data.

The data storage device controller 120 is configured to send a read command to the memory 104 to access data from a specified address of the memory 104. The read command may specify the physical address of a region of the memory 104 (e.g., a physical address of a word line of the memory 104). The data storage device controller 120 may also be configured to send data and commands to the memory 104 associated with background scanning operations, garbage collection operations, and/or wear-leveling operations, or other suitable memory operations.

The data storage device controller 120 may include a memory 124 (for example, a random access memory ("RAM"), a read-only memory ("ROM"), a non-transitory computer readable medium, or a combination thereof), an error correction code (ECC) engine 126, and an electronic processor 128 (for example, a microprocessor, a microcontroller, a field-programmable gate array ("FPGA") semiconductor, an application specific integrated circuit ("ASIC"), or another suitable programmable device). The memory 124 stores data and/or instructions that may be executable by the electronic processor 128. For example, the memory 124 stores ZWG construction instructions 131, a ZWG association table 139, and a NVMe host memory buffer (HMB) descriptor list 138 that is executable by the electronic processor 128. In some instances, the ZWG construction instructions 131, the ZWG association table 139, and the NVMe HMB descriptor list 138 are stored permanently in the memory 124. In other instances, at least the ZWG construction instructions 131 are received from the host device 150.

The ZWG association table 139 maps a ZWG stored in the memory 104 (e.g., a ZWG ID) to respective host and parity zones (e.g., zone IDs), described below in more detail. Accordingly, the data storage device controller 120 refers to the ZWG association table 139 to identify the location of host zones and parity zones within a ZWG. In some implementations, the memory 124 stores both a forward ZWG association table that maps a ZWG to respective host and parity zones, and a backward ZWG association table that maps host and parity zones to their respective ZWG.

Additionally, although the data storage device controller 120 is illustrated in FIG. 1 as including the memory 124, in other implementations, some or all of the memory 124 is instead located separate from the data storage device controller 120 and executable by the electronic processor 128 or a different electronic processor that is external to the data storage device controller 120 and/or the data storage device 102. For example, the memory 124 may be dynamic random-access memory (DRAM) that is separate and distinct from the data storage device controller 120 and includes some or all of the NVMe HMB descriptor list 138. As a result, operations that would normally be performed solely by the data storage device controller 120 described herein may be performed by the following: 1) the electronic processor 128 and different memory that is internal to the data storage device 102, 2) the electronic processor 128 and different memory that is external to the data storage device 102, 3) a different electronic processor that is external to the data storage device controller 120 and in communication with memory of the data storage device 102, and 4) a different electronic processor that is external to the data storage device controller 120 and in communication with memory that is external to the data storage device 102.

The NVMe HMB descriptor list 138 is a list of HMB address ranges that are for the exclusive use by the data storage device controller 120. The NVMe HMB descriptor list 138 is initially created during the preceding NVMe mode of the data storage device controller 120.

The data storage device controller 120 may send the memory operation 136 (e.g., a read command) to the memory 104 to cause the read/write circuitry 140 to sense data stored in a storage element. For example, the data storage device controller 120 may send the read command to the memory 104 in response to receiving a request for read access from the host device 150.

Figure 2:
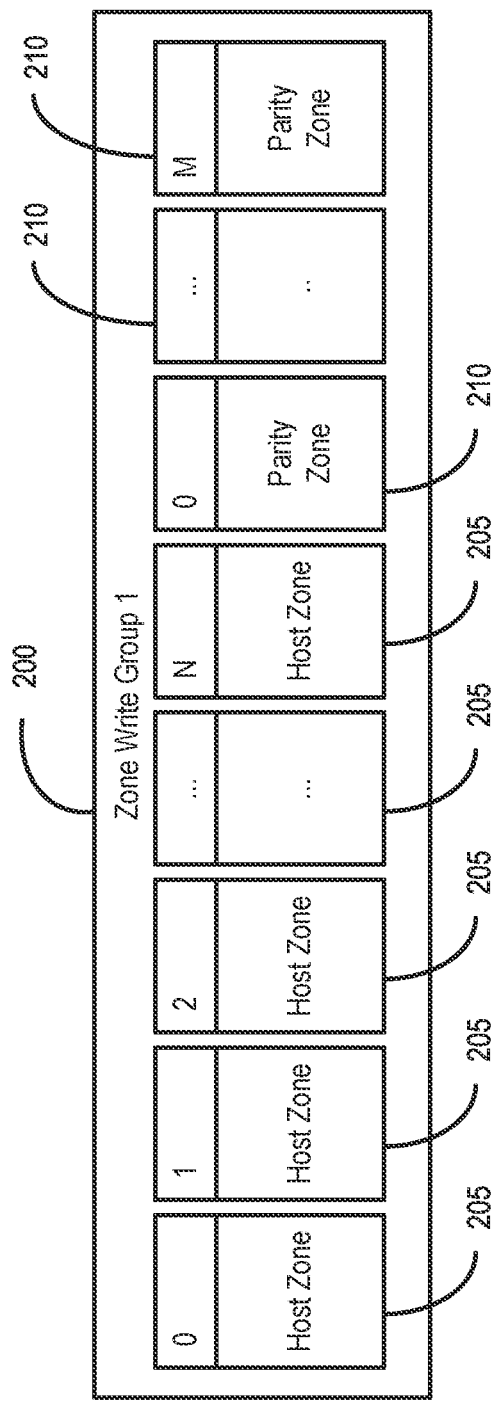
FIG. 2 is a block diagram of a ZWG, in accordance with various aspects of the disclosure.

As stated above, the group of storage elements 107A-107N may include zoned namespaces for storing data. In some instances, the zoned namespaces include ZWGs that comprise host zones for storing host data, and parity zones for storing parity data. FIG. 2 illustrates an example ZWG 200 stored in a zoned namespace. The ZWG 200 includes a plurality of host zones 205 and a plurality of parity zones 210. Each host zone 205 stores buffers received with ZNS host write commands from the host device 150. Each parity zone 210 stores parity buffers for the data stored in the plurality of host zones 205. The plurality of parity zones 210 are allocated from a pool of free zones during construction of the ZWG 200, as described below in more detail.

While FIG. 2 provides a single ZWG 200, in some instances, the zoned namespace includes a plurality of ZWGs 200 with a particular number of host zones 205 and parity zones 210. Each of the ZWGs 200 may include a varying number of host zones 205, a varying number of parity zones 210, or a combination thereof. For example, a first ZWG may include five host zones 205 and one parity zone 210, while a second ZWG may include ten host zones 205 and two parity zones 210.

Additionally, the host zones 205 and the parity zones 210 that form the ZWG 200 may be spread over multiple memory dies. Accordingly, in some implementations, the host zones 205 and the parity zones 210 include indicators (e.g., ZWG indicators, metadata, or other suitable indicators) indicating a ZWG 200 to which they belong or are associated with. Additionally, in some instances, the indicators indicate a type of the zone. For example, the indicators indicate whether a zone is a host zone 205 or whether a zone is a parity zone 210. The indicators may be, for example, headers included in the data frames stored in the host zones 205 and headers included in the data frames stored in the parity zones 210. In some embodiments, the indicator also indicates a type of the zone (e.g., whether the zone is a host zone 205 or a parity zone 210). By identifying the zones with indicators and spreading the ZWG 200 over multiple memory dies, the data storage device controller 120 may recover from failure of a single die and recreate lost data.

Figure 3:
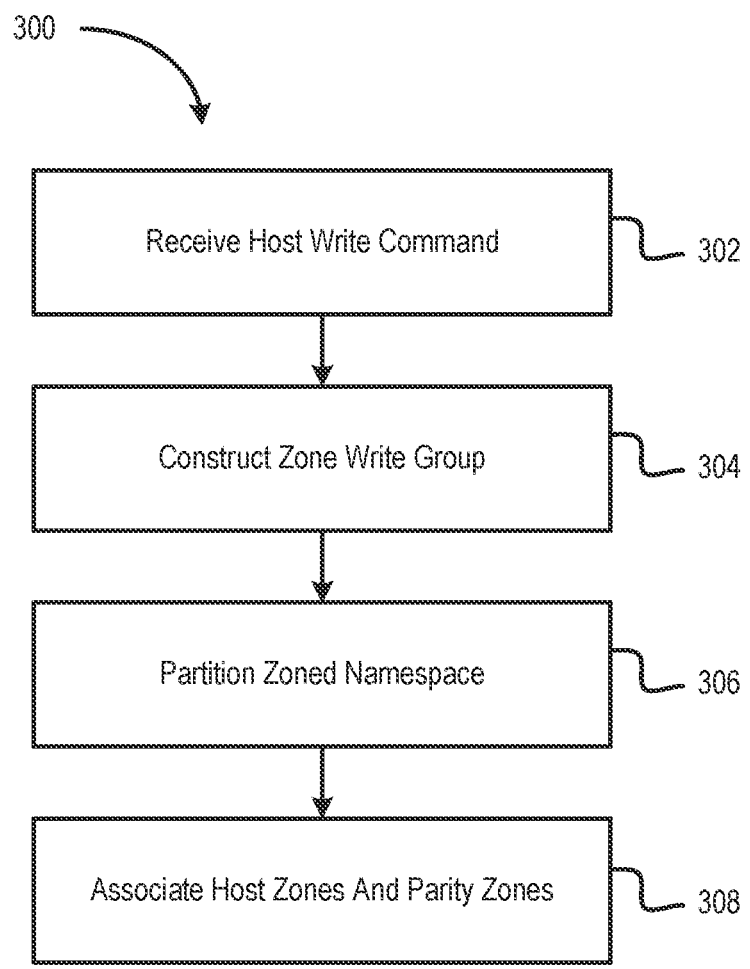
FIG. 3 is a flowchart illustrating an example method of constructing the ZWG of FIG. 2, in accordance with various aspects of the disclosure.

FIG. 3 is a flow diagram illustrating an example process 300 for constructing a ZWG 200, in accordance with various aspects of the present disclosure. The process 300 is described with respect to the data storage device controller 120 of FIG. 1. While FIG. 3 illustrates a particular order of steps, in some embodiments, steps may be performed in a different order. Additionally, in some embodiments, the process 300 includes additional steps or fewer steps.

As illustrated in FIG. 3, the process 300 includes the data storage device controller 120 receiving a host write command (at block 302). The host write command (e.g., the ZNS host write command) may include data to be written and zone construction information, such as an indicator (e.g., a ZWG indicator, indication metadata, or other suitable indicator), a host zone count indicating a number of host zones to include in the ZWG, a parity zone count indicating a number of parity zones to include in the ZWG, parity buffer accumulation instructions, host buffer accumulation instructions, or a combination thereof.

The process 300 includes the data storage device controller 120 constructing a ZWG 200 (at block 304). For example, the data storage device controller 120 applies the ZWG construction instructions 131 stored in the memory 124 to the zone construction information to construct the ZWG 200.

The process 300 includes the data storage device controller 120 partitioning a section of the zoned namespace as the ZWG 200 (at block 306). For example, the data storage device controller 120 assigns a subset of the zones within the ZWG 200 as host zones 205 and assigns a subset of the zones within the ZWG 200 as parity zones 210. The number of host zones 205 and the number of parity zones 210 is based on the host zone count and the parity zone count provided by the host write command.

The process 300 includes the data storage device controller 120 associating the host zones 205 with the parity zones 210 (at block 308). For example, the memory 124 includes a ZWG association table 139 that stores information indicating which host zones 205 and which parity zones 210 form the ZWG 200. Additionally, the ZWG association table 139 stores information indicating which parity zone 210 stores parity data for which host zone 205. By associating the host zones 205 and the parity zones 210, the data storage device controller 120 identifies which parity zone 210 corresponds to which host zones 205 during a recovery process, even if the zones are spread across different memory dies. Once the ZWG 200 is constructed and the host zones 205 are associated with parity zones 210, the ZWG 200 is enabled for write operations and parity buffer accumulation.

In some implementations, while constructing the ZWG 200, the data storage device controller 120 selects zones for the plurality of host zones 205 based on their lifespan expectancy (e.g., expected lifespan endurance). For example, the data storage device controller 120 identifies zones having similar lifespan expectancies and selects those zones to be the plurality of host zones 205. As previously stated, in ZNS SSDs, data is written sequentially. By grouping host zones 205 together based on lifespan expectancy (e.g., an age of the data), older data that can be written over is grouped together, providing easy access and identification by the data storage device controller 120. In some implementations, the host zones 205 are grouped together during a data garbage collection or relocation process.

In some instances, the host device 150 timely invalidates zones of the ZWG 200 to achieve close lifespan between the host zones 205 and to avoid a need for garbage collection by the data storage device controller 120. Accordingly, in some implementations, the host device 150 assists construction of the ZWG 200 by accumulating and providing buffers (such as parity buffers), providing construction instructions, assisting in or reducing garbage collection operations, other assistance operations, or various combinations thereof.

Once the ZWG 200 is constructed, the data storage device controller 120 stores various buffers in the ZWG 200. In one example, composition of the ZWG 200 includes data provided by the host device 150. For example, to write data to the memory 104, the host device 150 transmits ZNS host write commands to the data storage device controller 120. The ZNS host write commands includes memory buffers used by the data storage device controller 120 to construct the ZWG 200. In one instance, the data storage device controller 120 writes to both the plurality of host zones 205 and the plurality of parity zones 210 using the memory buffers provided by the host device 150. In another instance, the data storage device controller 120 writes only to the plurality of host zones 205 using the memory buffers provided by the host device 150, while the data storage device controller 120 writes to the plurality of parity zones 210 using buffers the data storage device controller 120 accumulates from those written to the plurality of host zones 205.

However, in other instances, the host device 150 is unaware of the ZWG 200 stored in the memory 104, and composition of data within the ZWG 200 is defined entirely by the data storage device controller 120. For example, both the plurality of host zones 205 and the plurality of parity zones 210 are written to using buffers accumulated by the data storage device controller 120. In some instances, where the host device 150 includes a host ZWG association table 154, the host device 150 populates the host ZWG association table 154 by requesting information stored in the ZWG association table 139 from the data storage device controller 120. In other implementations, the host device 150 is completely unaware of the ZWG 200, and does not store any information related to the ZWG 200.

Figure 4:
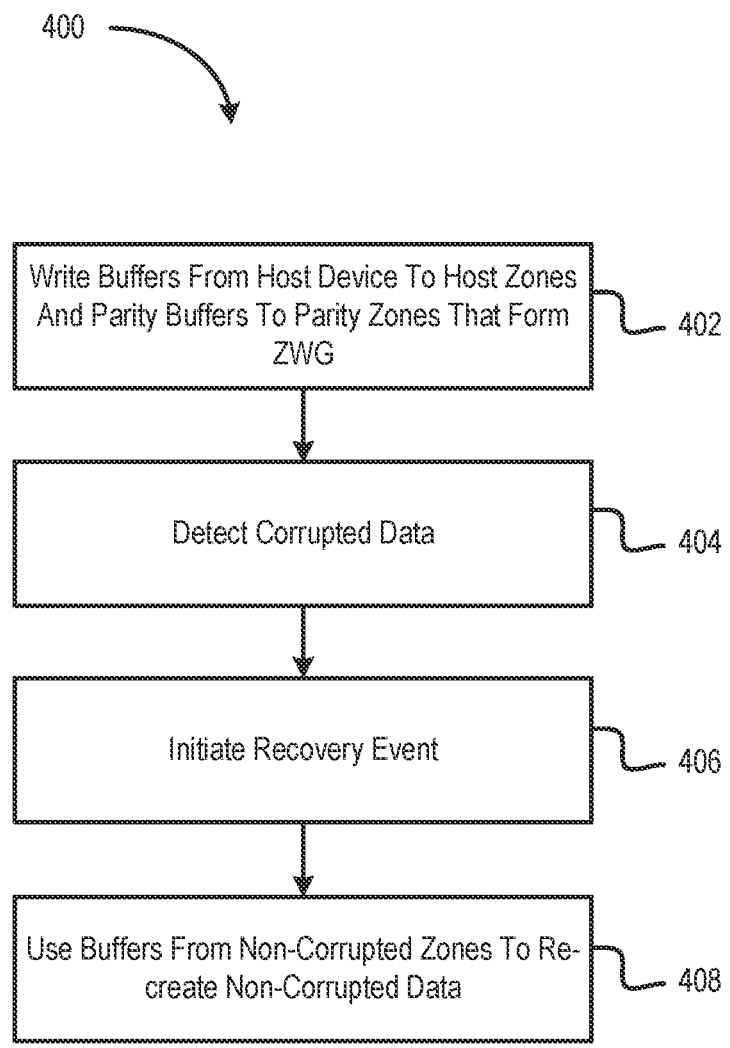
FIG. 4 is a flowchart illustrating an example method of recovering from a data loss event, in accordance with various aspects of the disclosure.

Should some aspect of the memory 104 experience an error, such as a memory die failure, the data storage device controller 120 uses the ZWG 200 (or the ZWG 200 and additional ZWGs that have zones stored at the failed die) to reconstruct the data. FIG. 4 is a flow diagram illustrating an example process 400 for recovering from a data loss event, in accordance with various aspects of the present disclosure. The process 400 is described with respect to the data storage device controller 120 of FIG. 1. During process 400, parity accumulation occurs on the host device 150. While FIG. 4 illustrates a particular order of steps, in some embodiments, steps may be performed in a different order. Additionally, in some embodiments, the process 400 includes additional steps or fewer steps.

The process 400 includes the data storage device controller 120 writing buffers from the host device 150 to host zones 205 and parity buffers to parity zones 210 that form a ZWG 200 stored in the memory 104 (at block 402). As one example, the data storage device controller 120 receives a host write command from the host device 150. The host write command includes parity buffers that are stored in the host zones 205 and the parity zones 210. In some instances, the parity buffers provided by the host device 150 are stored only in the parity zones 205.

The process 400 includes the data storage device controller 120 detecting corrupted data (at block 404). For example, the data storage device controller 120 detects a memory die 103 has become corrupted, or receives an indication (from, for example, the memory 104) that a memory die 103 has become corrupted. When the data storage device controller 120 detects a failure of memory, the data storage device controller 120 initiates a recovery event (at block 406).

The process 400 includes the data storage device controller 120 re-creating non-corrupted data using buffers from non-corrupted zones (at block 408). For example, when a memory die 103 that stores host data fails, the data storage device controller 120 uses accumulated host buffers written to the host zones 205 and/or parity buffers written to the parity zones 210 to re-create the data prior to the data becoming corrupted (e.g., lost or damaged), thereby performing a recovery process. In some implementations, the buffers used to re-create non-corrupted data are buffers from the same ZWG 200 of the corrupted data. Accordingly, the data storage device controller 120 recovers data prior to the data becoming corrupted by using data stored in the ZWG 200.

Figure 5:
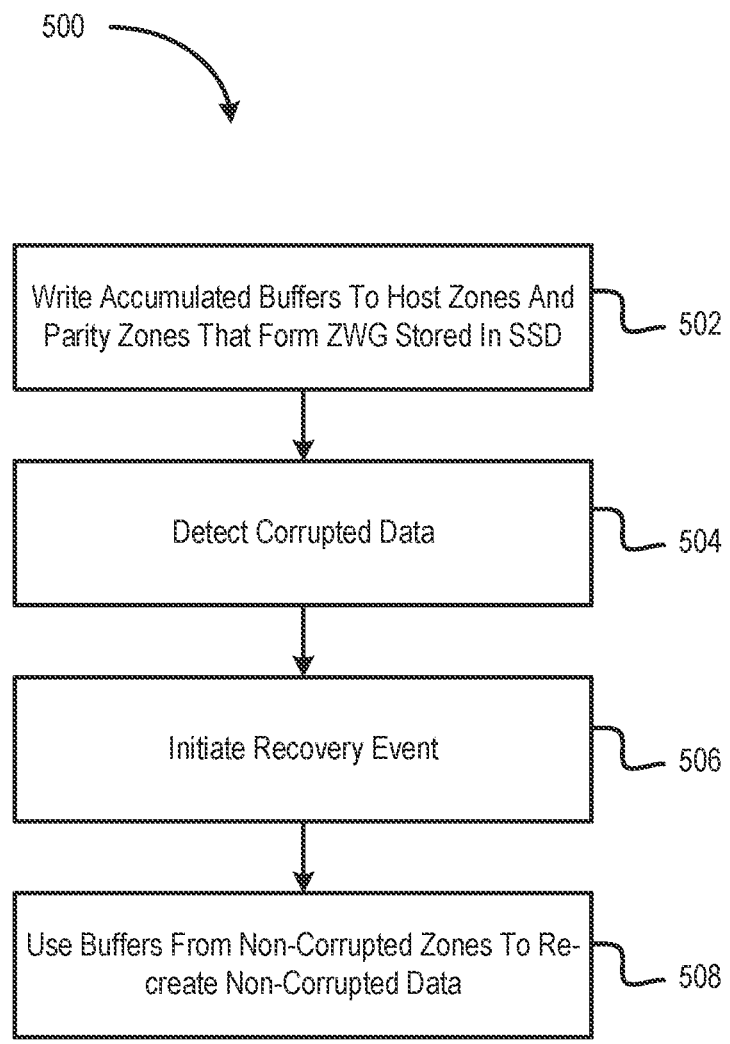
FIG. 5 is a flowchart illustrating another example method of recovering from a data loss event, in accordance with various aspects of the disclosure.

FIG. 5 is a flow diagram illustrating another example process 500 for recovering from a data loss event, in accordance with various aspects of the present disclosure. During process 500, parity accumulation occurs on the data storage device 102 and the ZWG 200 is stored on the memory 104. While FIG. 5 illustrates a particular order of steps, in some embodiments, steps may be performed in a different order. Additionally, in some embodiments, the process 500 includes additional steps or fewer steps.

The process 500 includes the data storage device controller 120 writing accumulated buffers to host zones 205 and parity zones 210 that form a ZWG 200 stored in the memory 104 (at block 502). For example, the data storage device controller 120 accumulates buffers while writing host data to the host zones 205.

The process 500 includes the data storage device controller 120 detecting corrupted data (at block 504). For example, the data storage device controller 120 detects a memory die 103 has become corrupted, or receives an indication that a memory die 103 has become corrupted. When the data storage device controller 120 detects a failure of memory, the data storage device controller 120 initiates a recovery event (at block 506).

The process 500 includes the data storage device controller 120 re-creating non-corrupted data using buffers from non-corrupted zones (at block 508). For example, when a memory die 103 that stores host data fails, the data storage device controller 120 uses accumulated parity buffers written to the host zones 205 and the parity zones 210 to re-create the data prior to the data becoming corrupted (e.g., lost or damaged), thereby performing a recovery process. Accordingly, the data storage device controller 120 replaces corrupted data with an earlier, uncorrupted version of the corrupted data by using data stored in the ZWG 200, and therefore by using buffers provided by the data storage device controller 120 itself.

Figure 6:
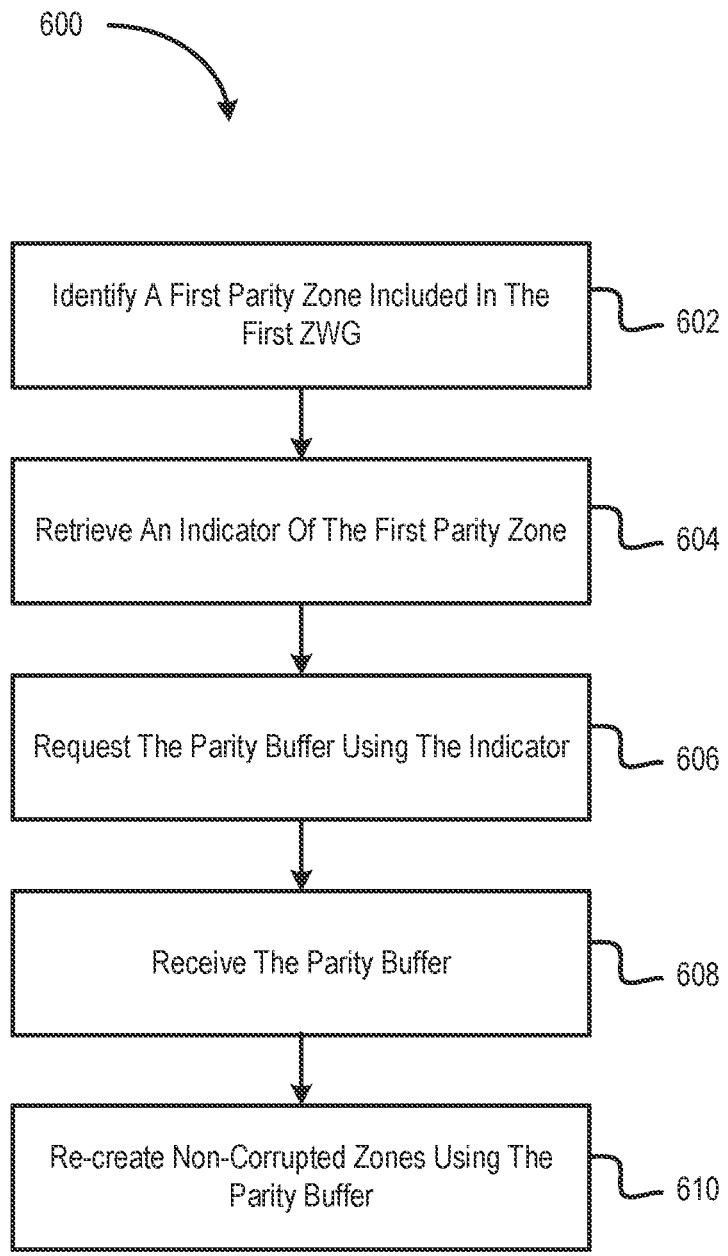
FIG. 6 is a flowchart illustrating an example method of retrieving buffers for data recovery, in accordance with various aspects of the disclosure.

FIG. 6 is a flow diagram illustrating an example process 600 for retrieving buffers for data recovery, in accordance with various aspects of the present disclosure. The process 600 is described with respect to the data storage device controller 120 of FIG. 1. While FIG. 6 illustrates a particular order of steps, in some embodiments, steps may be performed in a different order. Additionally, in some embodiments, the process 600 includes additional steps or fewer steps.

The process 600 includes the data storage device controller 120 identifying a first parity zone included in the ZWG 200 (at block 602). For example, the data storage device controller 120 identifies a parity zone 210 included in a ZWG 200 stored in the memory 104 by referencing the ZWG association table 139. The process 600 includes the data storage device controller 120 retrieving an indicator of the first parity zone (at block 604). The indicator indicates the location of the parity zone 210 within the ZWG 200.

The process 600 includes the data storage device controller 120 requesting a parity buffer stored in the first parity zone based on the indicator (at block 606). The process 600 includes the data storage device controller 120 re-creating non-corrupted zones using the parity buffer (at block 608).

While process 600 is described with respect to the data storage device controller 120 identifying a parity zone and receiving a parity buffer, in some instances, the data storage device controller 120 instead identifies a host zone (at block 602) and retrieves an indicator of the host zone (at block 604). The data storage device controller 120 requests a host buffer stored in a host zone included in the ZWG 200 (at block 606), receives the host buffer (at block 608), and recovers the corrupted zones using the host buffer (at block 610). Additionally, while process 600 is described with respect to the data storage device controller 120, in some instances, the host device 150 performs the process 600.

Additionally, in some instances, the process 600 includes the data storage device controller 120 requesting (at block 602) only a single parity buffer when a single parity buffer is needed to re-create non-corrupted zones. In other instances, the process 600 includes the data storage device controller 120 requesting two or more parity buffers.

It is to be understood that the above description is intended to be illustrative and not restrictive. Many embodiments and applications other than the examples provide would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device comprising:
a non-volatile memory including a plurality of zones in a Zoned NameSpace (ZNS), the ZNS including a Zone Write Group (ZWG) including a plurality of host zones and a plurality of parity zones; and
a data storage device controller including an interface configured to connect with a host device, an electronic processor and a data storage controller memory storing a set of construction instructions and a set of instruction that, when executed by the electronic processor, instruct the controller to:
receive, from the host device, a host write command, the host write command including construction information,
construct, with the set of construction instructions, the ZWG based on the construction information,
detect corrupted data associated with the ZWG,
request one or more buffers stored in the ZWG,
receive the one or more buffers from the ZWG, and
perform a recovery process of the ZWG using the one or more buffers by re-writing written sequential data,
wherein the construction information includes a ZWG indicator, a host zone count indicating a number of the plurality of host zones, and a parity zone count indicating a number of the plurality of parity zones.

2. The data storage device of claim 1, wherein, to construct the ZWG based on the construction information, the data storage device controller is further configured to:
associate each host zone included in the plurality of host zones with one or more parity zones included in the plurality of parity zones.

3. The data storage device of claim 1, wherein the data storage device controller is further configured to: receive host data buffers associated with the host write command, and populate the plurality of host zones with the host data buffers.

4. The data storage device of claim 1, wherein the data storage device controller is configured to perform the recovery process by re-creating non-corrupted data associated with the ZWG with the one or more buffers that are received from the ZWG.

5. The data storage device of claim 1, wherein the data storage device controller is further configured to:
identify a first parity zone included in the ZWG,
retrieve an indicator of the first parity zone,
request a parity buffer stored in the first parity zone based on the indicator, and
receive the parity buffer.

6. A method comprising:
receiving, with the data storage device controller, a write command from a host device, the write command including construction information,
constructing, with a data storage device controller, a Zone Write Group (ZWG) including one or more host zones and one or more parity zones in a Zoned NameSpace (ZNS) stored in a non-volatile memory, wherein constructing, with the data storage device controller, the ZWG includes constructing the ZWG using the construction information,
writing, with the data storage device controller, a host data buffer to a host zone of the one or more host zones and a parity buffer to a parity zone of the one or more parity zones,
detecting, with the data storage device controller, corrupted data associated with the ZWG,
requesting, with the data storage device controller, one or more buffers stored in the ZWG,
receiving, with the data storage device controller, the one or more buffers from the ZWG, and
performing, with the data storage device controller, a recovery process on the ZWG with the one or more buffers by re-writing written sequential data,
wherein the construction information includes a ZWG indicator, a host zone count indicating a number of host zones, and a parity zone count indicating a number of parity zones.

7. The method of claim 6, further comprising:
associating, with the data storage device controller, a first indicator with the host zone and associating a second indicator with the parity zone,
identifying, with the data storage device controller, the host zone based on the first indicator, and
identifying, with the data storage device controller, the parity zone based on the second indicator.

8. The method of claim 6, wherein performing the recovery process includes re-creating non-corrupted data associated with the ZWG with the one or more buffers that are received from the ZWG.

9. The method of claim 6, further comprising:
selecting, with the data storage device controller and during a garbage collection event, the plurality of host zones based on the host zones having a similar life endurance.

10. A data storage device comprising:
a non-volatile memory including a plurality of zones in a Zoned NameSpace (ZNS), the ZNS including a Zone Write Group (ZWG) including a plurality of host zones and a plurality of parity zones;
an interface configured to connect with a host device; and
a data storage device controller including an electronic processor and a data storage controller memory storing a set of construction instructions and a set of instructions that, when executed by the electronic processor, instruct the controller to:
receive, from the host device, a host write command, the host write command including construction information,
construct, with the set of construction instructions, the ZWG based on the construction information,
receive a plurality of buffers from the host device,
populate a host zone of the plurality of host zones with a buffer of the plurality of buffers,
detect corrupted data associated with the ZWG,
request the buffer stored in the host zone,
receive the buffer from the host zone, and
perform a recovery event of the ZWG with the buffer that is received from the host zone by re-writing written sequential data,
wherein the construction information includes a ZWG indicator, a host zone count indicating a number of the plurality of host zones, and a parity zone count indicating a number of the plurality of parity zones.

11. The data storage device of claim 10, wherein the host write command includes the plurality of buffers.

12. The data storage device of claim 10, wherein the data storage device controller is further configured to:
associate each host zone included in the plurality of host zones with one or more parity zones included in the plurality of parity zones.

13. The data storage device of claim 10, wherein the data storage device controller is further configured to:
   identify the host zone included in the ZWG,
   retrieve an indicator of the host zone,
   request the buffer stored in the host zone based on the indicator, and
   receive the buffer.

14. The data storage device of claim 10, wherein the data storage device controller is further configured to:
   populate a parity zone of the plurality of parity zones with a second buffer of the plurality of buffers,
   request the second buffer stored in the parity zone,
   receive the second buffer from the parity zone, and
   perform the recovery process with the second buffer that is received from the parity zone.

* * * * *